United States Patent
Hirai

(10) Patent No.: US 7,497,236 B2
(45) Date of Patent: Mar. 3, 2009

(54) VACUUM BRAKE HOSE

(75) Inventor: Ryo Hirai, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 11/493,796

(22) Filed: Jul. 27, 2006

(65) Prior Publication Data
US 2007/0034276 A1   Feb. 15, 2007

(30) Foreign Application Priority Data
Jul. 29, 2005   (JP) ............................. 2005-220965

(51) Int. Cl.
*F16L 9/14*   (2006.01)
(52) U.S. Cl. ................. 138/141; 138/125; 138/126; 138/DIG. 1; 428/36.91
(58) Field of Classification Search ................ 138/125, 138/126, 140, 141, 137, DIG. 1; 428/36.91
See application file for complete search history.

(56) References Cited

U.S. PATENT DOCUMENTS

| 4,330,017 | A | * | 5/1982 | Satoh et al. ................ 138/126 |
| 4,384,595 | A | * | 5/1983 | Washkewicz et al. ....... 138/127 |
| 4,425,919 | A | * | 1/1984 | Alston, Jr. et al. ............ 600/435 |
| 4,695,508 | A | * | 9/1987 | Kageyama et al. ........... 442/149 |
| 4,842,024 | A | * | 6/1989 | Palinchak .................... 138/125 |
| 4,905,734 | A | * | 3/1990 | Ito ............................... 138/125 |
| 4,905,736 | A | * | 3/1990 | Kitami et al. ................. 138/137 |
| 4,998,564 | A | * | 3/1991 | Igarashi et al. ............... 138/126 |
| 5,445,191 | A |   | 8/1995 | Green et al. ................. 138/126 |

FOREIGN PATENT DOCUMENTS

JP   8-113769 A   5/1996

* cited by examiner

*Primary Examiner*—Patrick F Brinson
(74) *Attorney, Agent, or Firm*—Westerman, Hattori, Daniels & Adrian, LLP.

(57) ABSTRACT

A vacuum brake hose having excellent interlaminar bonding strength between a tubular inner layer and an outer layer, as well as available at low cost by mass production. The vacuum brake hose comprising the tubular inner layer formed by using acrylonitrile-butadiene rubber, a reinforcing fiber layer provided on an outer peripheral surface of the tubular inner layer and the outer layer formed on an outer peripheral surface of the reinforcing fiber layer by using chloroprene rubber, wherein the reinforcing fiber layer is impregnated with adhesive consisting essentially of components (A) to (C) and interlaminar bonding between the tubular inner layer and the outer layer is effected through the adhesive:
(A) chloroprene rubber;
(B) acrylonitrile-butadiene rubber; and
(C) at least one filler of carbon black and a white filler.

4 Claims, 1 Drawing Sheet

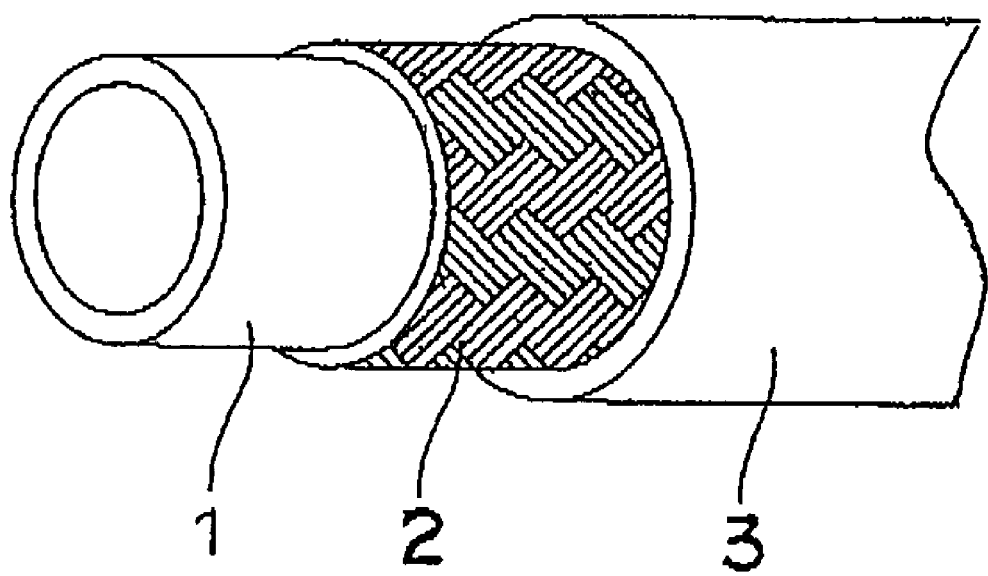
Figure

VACUUM BRAKE HOSE

BACKGROUND OF INVENTION

1. Field of the Invention

The present invention relates to a vacuum brake hose and specifically to a vacuum brake hose for use in a vacuum servo unit for braking.

2. Description of the Related Art

Generally, a vacuum brake hose (or master back hose) used for a vacuum servo unit for braking connects a brake booster and an intake manifold (of an engine) and has functions of absorbing vibrations caused by engine and caused during driving as well as transmitting a negative pressure generated in the intake manifold to the brake booster. The negative pressure generated when the engine introduces air is transmitted to the brake booster so as to be used in a circuit for increasing braking force and also decreasing force required for effecting the brake. Generally, such a brake hose requires extraction resistance (to prevent clogging of a check valve), non-staining properties (by coating), vibration absorbing properties, resistance to negative pressure, heat resistance and the like. With recent upgraded performances of automotive system, conditions (temperature, pressure and the like) of an engine compartment tend to be more severe, so that better performances of such hoses are demanded.

Since oil mist passes through the vacuum brake hose, which requires the above-mentioned performances, oil-resisting rubber such as acrylonitrile-butadiene rubber (NBR) is mostly used as an inner layer thereof, while chloroprene rubber (CR) having relatively good properties of ozone resistance and oil resistance is used as an outer layer thereof. As a hose having such a structure, for example, proposed is a hose having a structure of a tubular inner layer formed by acrylonitrile-butadiene rubber (NBR), a reinforcing fiber layer formed on an outer peripheral surface of the tubular inner layer and an outer rubber layer formed by chloroprene rubber (CR) on an outer peripheral surface of the reinforcing fiber layer, wherein an intermediate adhesive layer formed by chlorosulfonated polyethylene rubber (CSM) is intervened between the tubular inner layer and the reinforcing fiber layer (for example, see Japanese Unexamined Patent Publication No. 08-113769).

Since the hose of the above-mentioned Publication has the intermediate adhesive layer made of CSM, which is a relatively thick film, intervened between the tubular inner layer and the outer layer, there is a problem of cost increase. In the meantime, when the film thickness of the intermediate layer is decreased, interlaminar adhesion between an inner layer and an outer layer becomes insufficient, so that such a hose becomes difficult to sufficiently meet demands such as upgrade performances and prolonged life of the hose product.

SUMMARY OF THE INVENTION

In view of such circumstances, it is an object of the present invention to provide a vacuum brake hose having excellent interlaminar bonding strength between an inner layer and an outer layer, as well as available at low cost by mass production.

To this end, the present invention is a vacuum brake hose comprising a tubular inner layer formed by using acrylonitrile-butadiene rubber, a reinforcing fiber layer provided on an outer peripheral surface of the tubular inner layer and an outer layer formed on an outer peripheral surface of the reinforcing fiber layer by using chloroprene rubber, wherein the reinforcing fiber layer is impregnated with adhesive consisting essentially of components (A) to (C) and interlaminar bonding between the tubular inner layer and the outer layer is effected through the adhesive:

(A) chloroprene rubber;
(B) acrylonitrile-butadiene rubber; and
(C) at least one filler of carbon black and a white filler.

The present inventor intensively conducted studies to obtain a vacuum brake hose having excellent interlaminar bonding strength between an inner layer and an outer layer, as well as available at low cost by mass production. As a result, the present inventor found that when adhesive consisting essentially of chloroprene rubber (CR), acrylonitrile-butadiene rubber (NBR), and at least one filler of carbon black and a white filler is impregnated into a reinforcing fiber layer, interlaminar bonding strength between the inner layer and the outer layer is improved, and further the thus obtained vacuum brake hose is available at low cost by mass production. Thus, the inventor attained the present invention.

As mentioned above, according to the vacuum brake hose of the present invention, adhesive consisting essentially of chloroprene rubber (CR), acrylonitrile-butadiene rubber (NBR), and at least one filler of carbon black and a white filler is impregnated into a reinforcing fiber layer. Therefore, according to the present invention, interlaminar bonding strength between the inner layer and the outer layer is improved, and further there is an effect that the thus obtained vacuum brake hose is available at low cost by mass production.

When the weaving angle of the reinforcing fiber is within a specified range in the reinforcing fiber layer, adhesive penetrates well through the reinforcing fibers of the reinforcing fiber layer for forming each adhesive surface both on the upper and lower sides of the reinforcing fiber layer and strongly bonding the inner layer and the outer layer attached thereto, respectively. Further, pressure resistance and interlaminar bonding strength of the inner layer and the outer layer are well balanced therebetween.

When a mixture ratio by weight of the above-mentioned CR (component (A)) and the above-mentioned NBR (component (B)) is within a specified range, solubility and gelation of the adhesive are good, which improves productivity of the hose.

BRIEF DESCRIPTION OF THE DRAWING

The sole FIGURE of the drawing is a block diagram illustrating one embodiment of a vacuum brake hose according to the present invention.

DESCRIPTION OF THE PREFERRED EMBODIMENTS

Embodiments of the present invention will be described in detail below.

A vacuum brake hose of the present invention may have a structure, for example, as shown in the figure, by forming a reinforcing fiber layer 2 on an outer peripheral surface of a tubular inner layer 1 and further forming an outer layer 3 on an outer peripheral surface of the reinforcing fiber layer 2.

The main feature of the present invention is that the reinforcing fiber layer 2 is impregnated with adhesive consisting essentially of components (A) to (C) and interlaminar bonding between the tubular inner layer and the outer layer is effected through the adhesive;

(A) chloroprene rubber;
(B) acrylonitrile-butadiene rubber; and
(C) at least one filler of carbon black and a white filler.

In the vacuum brake hose according to the present invention, the tubular inner layer 1 is formed by material consisting mainly of acrylonitrile-butadiene rubber (NBR).

In the present invention, "X" consists mainly of "Y" generally means that "Y" occupies the majority of "X", and also includes the case where "x" is made of only "Y".

As the above-mentioned NBR, those which having an acrylonitrile amount (AN amount) of 27 to 35 are preferably used in terms of economic efficiency and extrusion processability.

The material for forming the tubular inner layer 1 may contain an antiaging agent, a reinforcing agent, a white filler, a plasticizer, stearic acid, zinc white, a vulcanizing agent, a vulcanizing accelerator, a processing aid and the like, as required, in addition to the above-mentioned NBR.

The NBR and other materials, such as the antiaging agent, as required, are blended appropriately, and then are kneaded by a kneading machine such as a roll, a kneader or a BANBURY mixer to prepare a material for forming the tubular inner layer 1.

The reinforcing fibers for forming the reinforcing fiber layer 2 are not specifically limited, but examples thereof may include, for example, a vinylon (polyvinyl alcohol) fiber, a polyamide (nylon) fiber, an aramid fiber, a polyethylene terephthalate (PET) fiber and a metallic wire, among which polyethylene terephthalate (PET) fiber is preferably used.

The weaving method of the reinforcing fibers is not specifically limited, but examples thereof may include, for example, a spiraling method and a braiding method.

The weaving angle of the reinforcing fiber in the reinforcing fiber layer 2 is preferably 35 to 45°. When the weaving angle is less than 35°, pressure resistance tends to become insufficient. On the contrary, when the weaving angle exceeds 45°, the resultant hose is favorable in terms of pressure resistance, however, the adhesive becomes difficult to penetrate through gaps among the reinforcing fiber layer 2 into a side of the tubular inner layer 1. As a result, the interlaminar adhesion between the tubular inner layer 1 and the outer layer 3 tends to decrease and insertability tends to deteriorate.

In the present invention, the weaving angle is an angle of orientation of the reinforcing fiber with respect to an axis of the hose body when forming the reinforcing fiber layer 2 by braiding the reinforcing fibers. The weaving angle may be measured, for example, by a protractor.

As the adhesive impregnated into the reinforcing fiber layer 2, the above-mentioned components (A) to (C) are used as essential components.

The above-mentioned CR (component (A)) is not specifically limited, but those which will not be modified with sulfur may be preferably used.

The above mentioned NBR (component (B)) is not specifically limited, but those which having an acrylonitrile amount (AN amount) of 27 to 35 are preferably used, as same as mentioned above.

The mixture ratio by weight of the chloroprene rubber (CR; component (A)) and the acrylonitrile-butadiene rubber (NBR; component (B)) is preferably (A)/(B)=50/50 to 90/10, especially preferably (A)/(B)=60/40 to 80/20. When the mixture ratio of the component (A) is less than 50 (or the mixture ratio of the component (B) exceeds 50), solubility to solvent deteriorates and adhesive strength tends to become insufficient. On the contrary, when the mixture ratio of the component (A) exceeds 90 (or the mixture ratio of the component (B) is less than 10), viscosity of the adhesive may be increased, resulting in gelation (or deteriorated storage stability of adhesive), so that the problems, such as nozzle clogging of an adhesive coater, may be caused.

As the specific filler (component (C)), at least one filler of carbon black and a white filler is used. Examples of the white filler include calcium carbonate, magnesium silicate, silicon dioxide (silica) and clay. These are used either alone or in combination thereof.

The mixture ratio of the specific filler (component (C)) is preferably 2 to 40 parts by weight (hereinafter, just abbreviated to "parts"), especially preferably 5 to 30 parts, based on the total amount of 100 parts of the CR (component (A)) and the NBR (component (B)). When the mixture ratio of the specific filler (component (C)) is less than 2 parts, adhesive strength tends to be decreased. On the contrary, when the mixture ratio exceeds 40 parts, solubility tends to deteriorate.

The above-mentioned adhesive may be used by dissolving thereof into solvent, such as toluene, ethyl acetate or methyl ethyl ketone (MEK). These may be used either alone or in combination thereof.

The solid content of the above-mentioned adhesive is preferably 5 to 15.0% by weight, especially preferably 5 to 8% by weight. When the solid content is less than 5% by weight, the adhesive strength tends to become insufficient. On the contrary, when the solid content exceeds 15.0% by weight, the viscosity of the adhesive increases so that spots tend to occur in coating.

The above-mentioned solid content means the total amount (weight) of the components (a) to (C) in the present invention.

The amount for impregnation of the adhesive (coverage of adhesive solid constituent) to be impregnated into the reinforcing fiber layer 2 is preferably 15 to 50 mg/cm$^2$, especially preferably 18 to 40 mg/cm$^2$. When the coverage is less than 15 mg/cm$^2$, the adhesive strength tends to become insufficient.

The above-mentioned coverage may be calculated, for example, as follows. The adhesive is dipped from a surface of the reinforcing fiber layer 2 braided on an outer peripheral surface of the tubular inner layer 1, and then is dried (generally at 80° C. for about 4 hours), so that the solvent is removed. Then, coverage per unit rubber area can be calculated by the difference between the weights before and after dipping.

The above-mentioned adhesive may be prepared by blending the above-mentioned components (A) to (C) and other materials, such as solvent (e.g., toluene), as required, and then kneading the thus obtained material by a kneading machine such as a roll, a kneader or a BANBURY mixer.

Further, the outer layer 3 is formed by material consisting mainly of chloroprene rubber (CR).

The above-mentioned CR is not specifically limited, but those which will not be modified with sulfur may be preferably used.

The material for forming the outer layer 3 may contain a vulcanizing agent, an acid receiver, an antiaging agent, a reinforcing agent, a white filler, a plasticizer, stearic acid, zinc white, a vulcanizing accelerator, a processing aid and the like, as required, in addition to the above-mentioned CR.

Examples of the vulcanizing agent include, for example, 2-mercaptoimidazoline and 2-mercaptobenzoimidazole. These are used either alone or in combination. Among them, a combined use of 2-mercaptoimidazoline and 2-mercaptobenzoimidazole is preferred.

The mixture ratio of the vulcanizing agent is preferably 0.3 to 5 parts, especially preferably 0.5 to 2 parts, based on the total amount of 100 parts of the CR.

Examples of the acid receiver include, for example, magnesium oxide and hydrotalcite. These are used either alone or in combination. Among them, a combined use of magnesium oxide and hydrotalcite is preferred because such an acid receiver can effectively trap chlorine released from the CR.

The mixture ratio of the acid receiver is preferably 1 to 30 parts, especially preferably 3 to 20 parts, based on the total amount of 100 parts of the CR.

The antiaging agent is not specifically limited, but examples thereof include amine-ketone based compounds, aromatic secondary amine based compounds, monophenol based compounds, bisphenol based compounds, polyphenol based compounds, benzimidazole based compounds, dithiocarbamate based compounds, dithiocarbamic acid based compounds, thiourea based compounds, phosphorous acid based compounds, organic thio acid based compounds, xanthogenate based compounds and special wax based compounds. These are used either alone or in combination.

The mixture ratio of the antiaging agent is preferably 0.1 to 10.0 parts, especially preferably 0.5 to 5 parts, based on the total amount of 100 parts of the CR.

The CR and other materials, such as the antiaging agent, as required, are blended appropriately, and then are kneaded by a kneading machine such as a roll, a kneader or a BANBURY mixer to prepare the material for forming the outer layer 3.

The vacuum brake hose of the present invention may be manufactured, for example, in the following manner. First, the material for forming the tubular inner layer 1 is formed into a tubular shape by extrusion. Next, a reinforcing fiber layer 2 is formed, for example, by spiraling reinforcing fibers, such as polyester fibers, onto an outer peripheral surface of the tubular inner layer 1. Further, the adhesive is impregnated into a surface of the reinforcing fiber layer 2 by uniform shower-coating at a closed cycle. Then, the material for forming the outer layer 3 is formed thereon by extrusion. Thus, the vacuum brake hose comprising the tubular inner layer 1, the reinforcing fiber layer 2 formed on an outer peripheral surface of the tubular inner layer 1, and the outer layer 3 formed on an outer peripheral surface of the reinforcing layer 2 is produced.

In the vacuum brake hose of the present invention, an inner diameter is preferably 2 to 50 mm, particularly preferably 5 to 40 mm and an outer diameter is preferably 2.6 to 70 mm, particularly preferably 3 to 50 mm. Further, a thickness of the tubular inner layer 1 is preferably 0.3 to 10 mm, particularly preferably 0.5 to 5 mm, and a thickness of the outer layer 3 is preferably 0.3 to 10 mm, particularly preferably 0.5 to 5 mm.

The structure of the vacuum brake hose of the present invention is not limited to the structure, as shown in the FIGURE. For example, an outermost layer may be further formed on an outer peripheral surface of the outer layer 3.

Examples of the present invention will be described below in conjunction with Comparative Examples.

The following materials were prepared for the Examples and Comparative Example.

Preparation of Adhesive A

An adhesive A was prepared by blending 90 parts of DENKA CHLOROPRENE M-40 which will not be modified with sulfur available from Denki Kagaku Kogyo Kabushiki Kaisha as CR (component (A)), 10 parts of NIPOL DN202 available from ZEON CORPORATION (AN amount: 31) as NBR (component (B)), 20 parts of magnesium silicate (MISTRON VAPOR TALC available from Nihon Mistron Co., Ltd.) as a white filler (component (C)), 2 parts of 2-mercaptoimidazoline (SANCELER 22C available from SANSHIN CHEMICAL INDUSTRY CO., LTD.) as a vulcanizing accelerator, 5 parts of zinc oxide and 1500 ml of toluene and kneading the resulting mixture by means of a roll.

Preparation of Adhesives B to E and a to c

Each adhesive was prepared by blending the ingredients in a blend ratio as shown in Tables 1 and 2 and kneading the resulting mixture by means of a roll.

Properties of the thus obtained adhesives were evaluated in the following manners. The results of the evaluations are also shown in Tables 1 and 2.

Solubility

Each adhesive solid constituent (excluding toluene) and each solvent (toluene) were mixed in a blend ratio as shown in Tables 1 and 2, and were stirred for 2 hours, and then were allowed to stand in resting state at room temperature for 24 hours, for evaluation of solubility of adhesive to solvent. Solubility was evaluated by coating each diluted adhesive after being allowed to stand on a smooth surface by means of a spatula. When insoluble content of any piece exceeding a size of 1 mm$^2$ exists, the evaluation was bad (X). When such diluted adhesive was fully solubilized, the evaluation was good (◯). When solubility was slightly inferior to the good evaluation, the evaluation was regarded as fair (Δ).

Anti-Gelling Property

Each adhesive was stirred at 40° C. for 168 hours under open system for evaluation of anti-gelling property. To maintain solid content of the adhesive, solvent was replenished, as required. When the viscosity was not less than 200 cps/25° C., evaluation was poor (X), because there is fear that deficiency, such as nozzle clogging of an adhesive coater, may occur, which means poor mass-productivity. When the viscosity was less than 200 cps/25° C., evaluation was good (◯). When anti-gelling property was slightly inferior to the good evaluation, the evaluation was regarded as fair (Δ).

Adhesive Strength

Each adhesive was coated on an unvulcanized NBR sheet having a thickness of 1.7 mm, respectively, and immediately an unvulcanized CR sheet having the same thickness was pressure bonded thereon by a roller, and then the thus obtained sheet was vulcanized at 150° C. for 30 minutes. An inch-wide test piece was formed from the thus obtained sheet and then was peeled at a speed of 50 mm/min by a T-shaped peeling tester. The thus obtained minimum load was regarded as adhesive strength (kg/inch).

TABLE 1

| | (parts by weight) | | | | |
|---|---|---|---|---|---|
| | Adhesive | | | | |
| | A | B | C | D | E |
| CR | 90 | 80 | 50 | 80 | 80 |
| NBR | 10 | 20 | 50 | 20 | 20 |
| Carbon black *1 | — | 20 | 20 | 5 | 40 |
| White filler | 20 | — | — | — | — |
| Vulcanizing accelerator | 2 | 2 | 2 | 2 | 2 |
| Zinc oxide | 5 | 5 | 5 | 5 | 5 |
| Toluene (ml) | 1500 | 1500 | 1500 | 1320 | 1130 |
| Solid content of adhesive (% by weight) | 8.5 | 8.5 | 8.5 | 8.5 | 8.5 |
| Solubility | ◯ | ◯ | Δ | ◯ | ◯ |
| Anti-gelling property | Δ | ◯ | ◯ | ◯ | ◯ |
| Adhesive strength (kg/inch) | 7.2 | 8.4 | 6.2 | 6.9 | 7.1 |

*1: FEF (Fast Extruding Furnace) carbon black (SEAST SO available from Tokai Carbon Co., Ltd.)

TABLE 2

| | (parts by weight) | | |
|---|---|---|---|
| | Adhesive | | |
| | a | b | c |
| CR | 100 | — | 80 |
| NBR | — | 100 | 20 |
| Carbon black *1 | 20 | 20 | — |
| White filler | — | — | — |
| vulcanizing accelerator | 2 | 2 | 2 |
| Zinc oxide | 5 | 5 | 5 |
| Toluene (ml) | 1500 | 1500 | 1260 |
| Solid content of adhesive (% by weight) | 8.5 | 8.5 | 8.5 |
| Solubility | ◯ | X | ◯ |
| Anti-gelling property | X | ◯ | ◯ |
| Adhesive strength (kg/inch) | 7.1 | 0.7 | 4.3 |

*1: FEF (Fast Extruding Furnace) carbon black (SEAST SO available from Tokai Carbon Co., Ltd.)

As results shown in the above tables 1 and 2, adhesives A to E were each good at solubility and anti-gelling property and excellent in adhesive strength.

On the other hand, adhesive a was inferior in anti-gelling property, because the adhesive a was prepared by using CR solely and did not include NBR. Adhesive b had low adhesive strength because the adhesive b was prepared by using NBR solely and did not include CR, and thus its adhesive ingredient was precipitated. Since adhesive c includes neither carbon black nor a white filler, the adhesive c had low adhesive strength.

Next, each hose was produced by using the above-mentioned adhesive.

Example 1

Preparation of Material for Forming Inner Layer

A material for forming an inner layer was prepared by blending 100 parts of NBR (NIPOL DN202 available from ZEON CORPORATION; AN amount: 31), 70 parts of FEF (Fast Extruding Furnace) carbon black (SEAST SO available from Tokai Carbon Co., Ltd.) as a reinforcing material, 40 parts of magnesium silicate (MISTRON VAPOR TALC available from Nihon Mistron Co., Ltd.) as a white filler, 15 parts of a plasticizer (ADK CIZER RS107 available from ADEKA CORPORATION), 1 part of stearic acid (LUNAC S30 available from KAO CORPORATION), 5 parts of zinc white (2 kinds of zinc oxide available from Mitsui Mining Smelting Co., Ltd.), 2 parts of a condensate of acetone and diphenylamine (NON-FLEX BA available from Seiko Chemical Co., Ltd.) as an amine-ketone antiaging agent, 2 parts of octylated diphenylamine (NOCLAC AD available from OUCHISHINKO CHEMICAL INDUSTRIAL CO., LTD.) as a long alkyl chain substituted diphenylamine antiaging agent, 2 parts of N-phenyl-N'-isopropyl-p-phenylenediamine (OZONONE 3C available from Seiko Chemical Co., Ltd.) as an antiaging agent, 0.5 parts of a vulcanizing agent (sulfur), 1.5 parts of tetramethylthiuram disulfide (SANCELER TT available from SANSHIN CHEMICAL INDUSTRY CO., LTD.) as a vulcanizing accelerator and 1.5 parts of N-cyclohexyl-2-benzothiazyl sulfenamide (SANCELER CZ available from SANSHIN CHEMICAL INDUSTRY CO., LTD.) as a vulcanizing accelerator, and kneading the resulting mixture by means of a 1.7-liter BANBURY mixer.

Preparation of Adhesive

The adhesive A, prepared in the above-mentioned manner, was used here.

Preparation of Material for Forming Outer Layer

A material for forming an outer layer was prepared by blending 100 parts of CR (DENKA CHLOROPRENE M-40, which will not be modified with sulfur, available from DENKI KAGAKU KOGYO KABUSHIKI KAISHA), 50 parts of FEF (Fast Extruding Furnace) carbon black (SEAST SO available from Tokai Carbon Co., Ltd.) as a reinforcing material, 25 parts of heavy calcium carbonate (WHITON SB available from Shiraishi Calcium Kaisha Ltd.) as a white filler, 20 parts of canola oil (canola oil available from AJINOMOTO Co., INC.) as a plasticizer, 1 part of stearic acid (LUNAC S30 available from KAO CORPORATION), 10 parts of zinc white (2 kinds of zinc oxide available from Mitsui Mining Smelting Co., Ltd.), 5 parts of high-activated magnesium (KYOWA MAG #150, available from Kyowa Chemical Industry Co., Ltd.) as an acid receiver, 5 parts of hydrotalcite ($Mg_{4.5}Al_2(OH)_{13}CO_3.3.5H_2O$; DHT-4A available from Kyowa Chemical Industry Co., Ltd.) as an acid receiver, 2 parts of a condensate of acetone and diphenylamine (NON-FLEX BA available from Seiko Chemical Co., Ltd.) as an amine-ketone antiaging agent, 2 parts of octylated diphenylamine (NOCLAC AD available from OUCHISHINKO CHEMICAL INDUSTRIAL CO., LTD.) as a long alkyl chain substituted diphenylamine antiaging agent, 1 part of N-phenyl-N'-isopropyl-p-phenylenediamine (OZONONE 3C available from Seiko Chemical Co., Ltd.) as an antiaging agent, 0.5 parts of 2-mercaptoimidazoline (SANCELER 22C available from SANSHIN CHEMICAL INDUSTRY CO., LTD.) as a vulcanizing agent, 0.5 parts of 2-mercaptobenzoimidazole (NOCLAC MB available from OUCHISHINKO CHEMICAL INDUSTRIAL CO., LTD.) as a vulcanizing agent and 0.5 parts of tetramethylthiuram disulfide (SANCELER TT available from SANSHIN CHEMICAL INDUSTRY CO., LTD.) as a vulcanizing accelerator, and kneading the resulting mixture by means of a 1.7-liter BANBURY mixer.

Production of Hoses

The material for forming an inner layer was formed into a tubular shape by extrusion. Next, reinforcing fibers (PET fibers or filaments; 1,500 denier) were braided on an outer peripheral surface of the inner layer for forming a reinforcing layer by spiralling 1 warp by 24 wefts. In turn, the adhesive is impregnated into the reinforcing fiber layer by uniform shower-coating at a closed cycle. Then, the material for forming the outer layer is extruded for forming the outer layer. Thus, the hose (inner diameter: 8.7 mm, outer diameter: 17.5 mm) comprising the tubular inner layer (thickness: 3.0 mm), the reinforcing fiber layer formed on an outer peripheral surface of the tubular inner layer, and the outer layer (thickness: 1.2 mm) formed on an outer peripheral surface of the reinforcing fiber layer is produced.

Examples 2 to 5 and Comparative Examples 1 to 3

Preparation of Adhesive

Each adhesive prepared in the above-mentioned manner was used here.

Production of Hoses

Hoses were produced in the same manner as in EXAMPLE 1 except that adhesives or kinds of the reinforcing fibers were changed as shown in Tables 3 and 4.

Properties of the hoses produced in accordance with the EXAMPLES and the COMPARATIVE EXAMPLE were evaluated in the following manners. The results of the evaluations are also shown in Tables 3 and 4.

Weaving Angle of Reinforcing Fiber

The weaving angle of the reinforcing fiber was measured by a protractor.

Adhesive Solid Content

The ratio by weight of the adhesive except for solvent (toluene) was regarded as solid content of the adhesive (% by weight). Therefore, the solid content could be adjusted by an optional amount of solvent (toluene).

Coverage of Adhesive Solid Constituent

Each adhesive was dipped from a surface of the reinforcing fiber layer braided on an outer peripheral surface of the inner layer, and then was dried at 80° C. for 6 hours, so that the solvent was removed. Then, coverage per unit rubber area $(mg/cm^2)$ was calculated by the difference between the weights before and after dipping.

Pressure Resistance (Bursting Strength)

Each pressure resistance was evaluated in accordance with Japanese Industrial Standards (JIS) K 6330-2. When the value was not less than 2.0 Mpa, the evaluation was regarded as good (○). When it was not less than 2.4 Mpa, the evaluation was excellent (◎). When it was less than 2.0 Mpa, the evaluation was poor (X).

Measurement of Adhesive Strength

Adhesive strength of each hose was measured in accordance with JIK K 6330-6. A specimen of 1-inch length was obtained from each hose. The distal end of the outer layer was peeled, and was fixed to a gripper of a tensile testing machine, and then was peeled at a speed of 25.4 mm/min thereby. The thus obtained minimum load until the specimen went into a 360-degree roll for peeling the outer layer completely was regarded as adhesive strength (N/inch).

Evenness of Coating

Evenness of coating of each adhesive was evaluated. The hose was coated with adhesive lengthwise (or from above the hose). When the adhesive reached fully the opposite end (or lower part) of the hose, the evaluation was regarded as good (○). When the adhesive did not reach the opposite end (or lower part) of the hose, the evaluation was regarded as poor (X).

Insertability

A specified pipe was installed on a load cell. The load was read when each hose was inserted therein by 30 mm. When the load was not more than 100 N, the evaluation was regarded as good (○). When the value was over 100 N, the evaluation was poor (X).

TABLE 3

|  | EXAMPLE | | | | |
| --- | --- | --- | --- | --- | --- |
|  | 1 | 2 | 3 | 4 | 5 |
| Kind of adhesive | A | B | C | D | E |
| Kind of reinforcing fiber | *1 | *1 | *2 | *1 | *1 |
| Angle of reinforcing fiber (*) | 35 | 40 | 40 | 35 | 35 |
| Solid content of adhesive (% by weight) | 8.5 | 8.5 | 8.5 | 12.5 | 8.5 |
| Coverage of adhesive (mg/cm2) | 18.5 | 18.5 | 18.5 | 39.8 | 18.5 |
| Pressure resistance | ○ | ○ | ○ | ○ | ○ |
| Adhesive strength (N/inch) | 52 | 45 | 43 | 58 | 61 |

TABLE 3-continued

|  | EXAMPLE | | | | |
| --- | --- | --- | --- | --- | --- |
|  | 1 | 2 | 3 | 4 | 5 |
| Evenness of coating | ○ | ○ | ○ | ○ | ○ |
| Insertability | ○ | ○ | ○ | ○ | ○ |

*1: PET1500D/1 (filament)
*2: PET20S/6 (span)

TABLE 4

|  | COMPARATIVE EXAMPLE | | |
| --- | --- | --- | --- |
|  | 1 | 2 | 3 |
| Kind of adhesive | a | b | c |
| Kind of reinforcing fiber | *1 | *1 | *1 |
| Angle of reinforcing fiber (*) | 30 | 45 | 35 |
| Solid content of adhesive (% by weight) | 8.5 | 8.5 | 3.4 |
| Coverage of adhesive (mg/cm2) | 18.5 | 18.5 | 2.8 |
| Pressure resistance | X | ◎ | ○ |
| Adhesive strength (N/inch) | — | 40 | 22 |
| Evenness of coating | ○ | ○ | ○ |
| Insertability | ○ | X | ○ |

*1: PET1500D/1 (filament)

The results of Tables 3 and 4 demonstrated that the hoses of the EXAMPLES were excellent in pressure resistance, flexibility, interlaminar adhesion and insertability.

On the other hand, the hose of COMPARATIVE EXAMPLE 1 had inferior pressure resistance, the hose of COMPARATIVE EXAMPLE 2 had inferior insertability, and the hose of COMPARATIVE EXAMPLE 3 had inferior interlaminar adhesion.

APPLICABILITY OF THE INVENTION

The vacuum brake hose of the present invention can be used preferably for a vacuum servo unit for braking.

What is claimed is:

1. A vacuum brake hose comprising a tubular inner layer formed by using acrylonitrile-butadiene rubber, a reinforcing fiber layer provided on an outer peripheral surface of the tubular inner layer and an outer layer formed on an outer peripheral surface of the reinforcing fiber layer by using chloroprene rubber, wherein the reinforcing fiber layer is impregnated with an adhesive soluble in an organic solvent and consisting essentially of components (A) to (C) which do not originate from either the tubular inner layer or the outer layer, and interlaminar bonding between the tubular inner layer and the outer layer is effected through the adhesive:

(A) chloroprene rubber;
 (B) acrylonitrile-butadiene rubber; and
 (C) at least one filler of carbon black and a white filler.

2. A vacuum brake hose according to claim 1, wherein weaving angle of the reinforcing fiber is 35 to 45° in the reinforcing fiber layer.

3. A vacuum brake hose according to claim 1, wherein a mixture ratio by weight of the component (A) and the component (B) is (A)/(B)=50/50 to 90/10.

4. A vacuum brake hose according to claim 2, wherein a mixture ratio by weight of the component (A) and the component (B) is (A)/(B)=50/50 to 90/10.

* * * * *